(12) United States Patent
Mundy

(10) Patent No.: US 10,762,779 B1
(45) Date of Patent: Sep. 1, 2020

(54) EMERGENCY VEHICLE ALERT DEVICE

(71) Applicant: Timothy Mundy, Stone Mountain, GA (US)

(72) Inventor: Timothy Mundy, Stone Mountain, GA (US)

( * ) Notice: Subject to any disclaimer, the term of this patent is extended or adjusted under 35 U.S.C. 154(b) by 0 days.

(21) Appl. No.: 16/391,379

(22) Filed: Apr. 23, 2019

(51) Int. Cl.
*G08G 1/0965* (2006.01)
*B60W 40/04* (2006.01)
*G08G 1/0968* (2006.01)
*B60W 50/14* (2020.01)

(52) U.S. Cl.
CPC .......... *G08G 1/0965* (2013.01); *B60W 40/04* (2013.01); *B60W 50/14* (2013.01); *G08G 1/0968* (2013.01); *B60W 2050/146* (2013.01)

(58) Field of Classification Search
CPC .................................................. G08G 1/0965
See application file for complete search history.

(56) References Cited

U.S. PATENT DOCUMENTS

| | | | |
|---|---|---|---|
| 3,710,313 A | 1/1973 | Macaulay | |
| 5,495,243 A | 2/1996 | McKenna | |
| D374,831 S | 10/1996 | Hoyt | |
| 5,739,767 A | 4/1998 | Carr | |
| 5,926,112 A | 7/1999 | Hartzell | |
| 6,859,147 B2 | 2/2005 | Buscemi | |
| 8,159,368 B2 | 4/2012 | Kirkpatrick | |
| 9,479,212 B1* | 10/2016 | Garcia | G06F 1/203 |
| 2002/0102961 A1 | 8/2002 | Gibbons | |
| 2003/0193407 A1 | 10/2003 | Russell | |
| 2007/0159354 A1* | 7/2007 | Rosenberg | G08G 1/0965 |
| | | | 340/902 |
| 2009/0085873 A1* | 4/2009 | Betts | G08B 21/0275 |
| | | | 345/169 |
| 2011/0227756 A1* | 9/2011 | Otero | G08G 1/096716 |
| | | | 340/901 |

FOREIGN PATENT DOCUMENTS

GB 2408371 3/2006

* cited by examiner

*Primary Examiner* — Nabil H Syed
*Assistant Examiner* — Cal J Eustaquio

(57) ABSTRACT

The emergency vehicle alert device is a traffic control signal. The emergency vehicle alert device comprises an emergency vehicle beacon and a civilian receiver. The emergency vehicle beacon mounts in the emergency vehicle. The civilian receiver mounts in the civilian vehicle. The emergency beacon transmits a radio signal communicating GPS coordinates when operating in an emergency mode. The civilian receiver receives the transmitted radio signal and calculates the distance and direction of the emergency vehicle from the civilian vehicle.

15 Claims, 4 Drawing Sheets

US 10,762,779 B1

EMERGENCY VEHICLE ALERT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics, instruments and traffic control systems for road vehicles, more specifically, an arrangement for providing variable traffic instruction that is: a) mounted inside a vehicle; and, b) that responds to signals from another vehicle. (G08G1/0965)

SUMMARY OF INVENTION

The emergency vehicle alert device is a traffic control signal. The emergency vehicle alert device is configured for use with an emergency vehicle. The emergency vehicle alert device is configured for use with a civilian vehicle. The emergency vehicle alert device comprises an emergency vehicle beacon and a civilian receiver. The emergency vehicle beacon mounts in the emergency vehicle. The civilian receiver mounts in the civilian vehicle. The emergency beacon is activated when the emergency vehicle is operating in an emergency mode selected from the group consisting of: a) traveling with a set of emergency lights activated; b) traveling with an emergency siren activated; and, c) traveling with both the emergency lights and the emergency siren activated.

The emergency vehicle beacon transmits a radio signal when activated. The transmitted radio signal communicates the GPS coordinates of the emergency vehicle (hereinafter the EV GPS coordinates). The civilian receiver receives a plurality of GPS coordinates from the transmitted radio signal. The civilian receiver determines the GPS coordinates of the civilian vehicle (hereinafter CV GPS coordinates). The civilian receiver calculates the distance and direction of the emergency vehicle from the civilian vehicle by comparing the EV GPS coordinates to the CV GPS coordinates. The civilian receiver tracks the distance between the emergency vehicle and the civilian vehicle over time.

If the civilian receiver determines that: a) the emergency vehicle is within a predetermined distance from the civilian vehicle; while b) the span of the distance between the emergency vehicle and the civilian vehicle is decreasing; then, c) the civilian receiver generates visual and audible alerts informing the operator of the civilian vehicle of the direction and distance of the emergency relative to the civilian vehicle.

These together with additional objects, features and advantages of the emergency vehicle alert device will be readily apparent to those of ordinary skill in the art upon reading the following detailed description of the presently preferred, but nonetheless illustrative, embodiments when taken in conjunction with the accompanying drawings.

In this respect, before explaining the current embodiments of the emergency vehicle alert device in detail, it is to be understood that the emergency vehicle alert device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the emergency vehicle alert device.

It is therefore important that the claims be regarded as including such equivalent construction insofar as they do not depart from the spirit and scope of the emergency vehicle alert device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
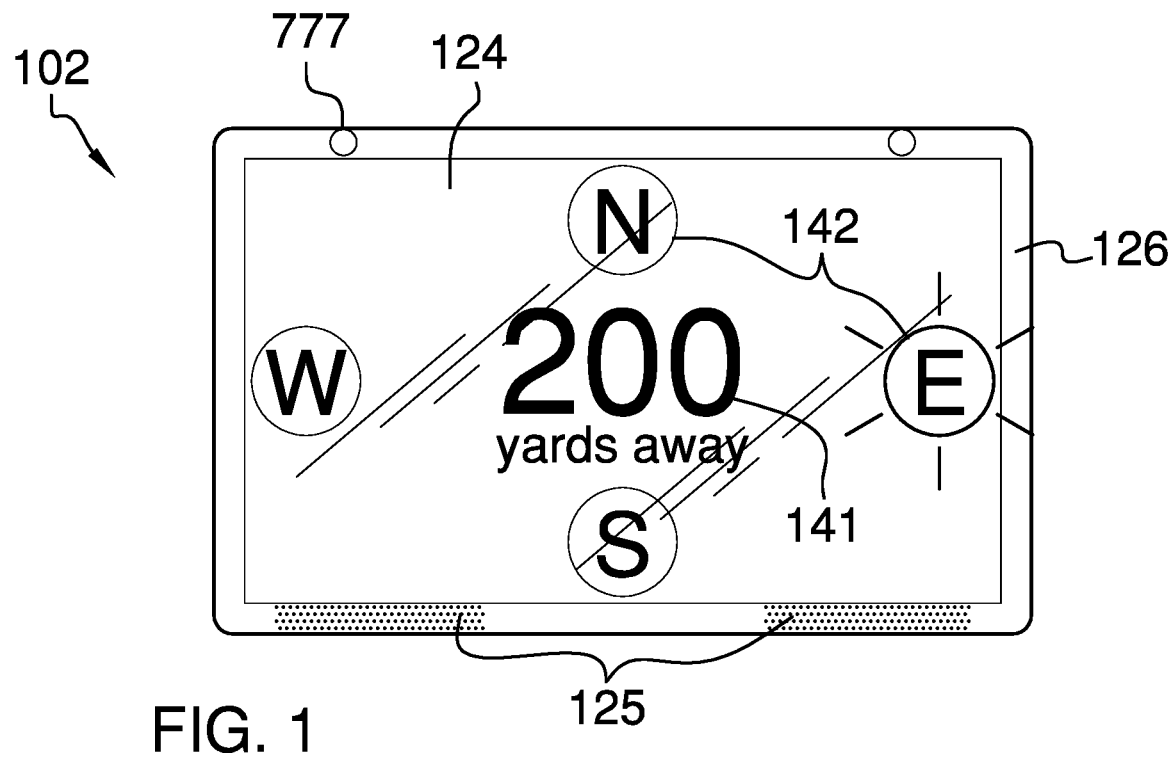
FIG. 1 is a front view of an embodiment of the disclosure.
Figure 2:
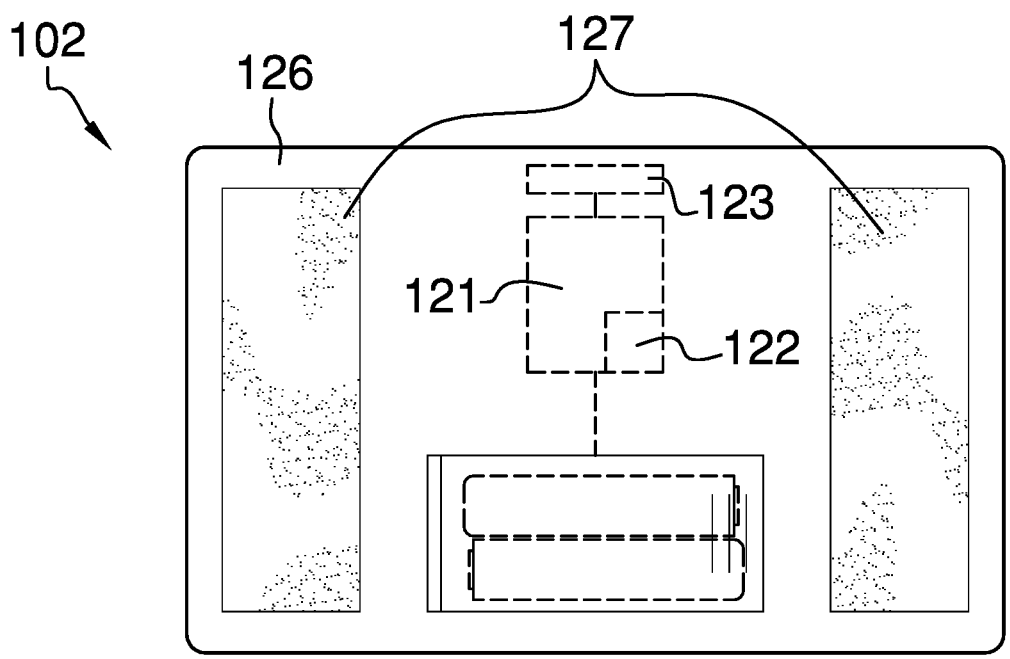
FIG. 2 is a rear view of an embodiment of the disclosure.
Figure 3:
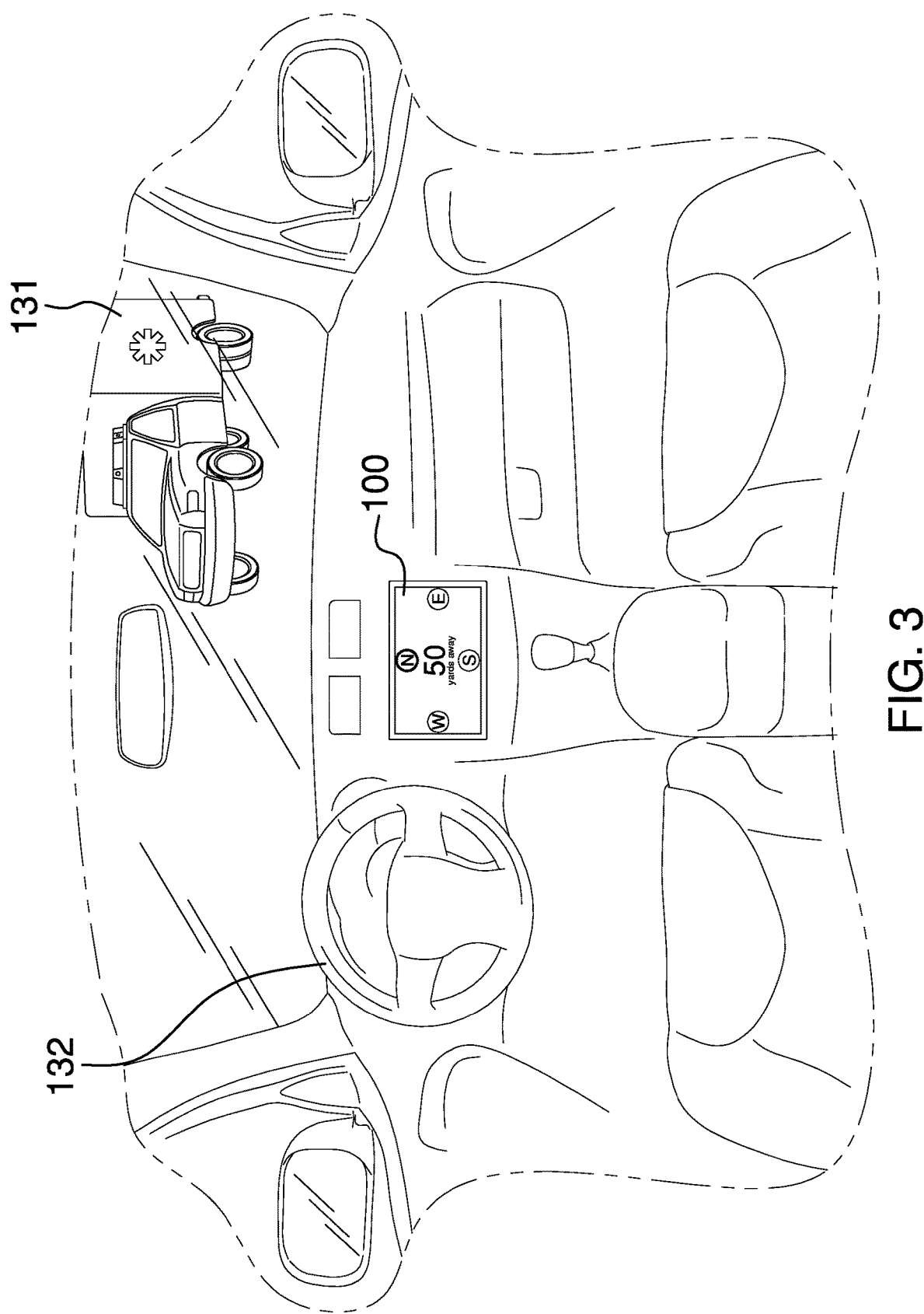
FIG. 3 is an in-use view of an embodiment of the disclosure.
Figure 4:
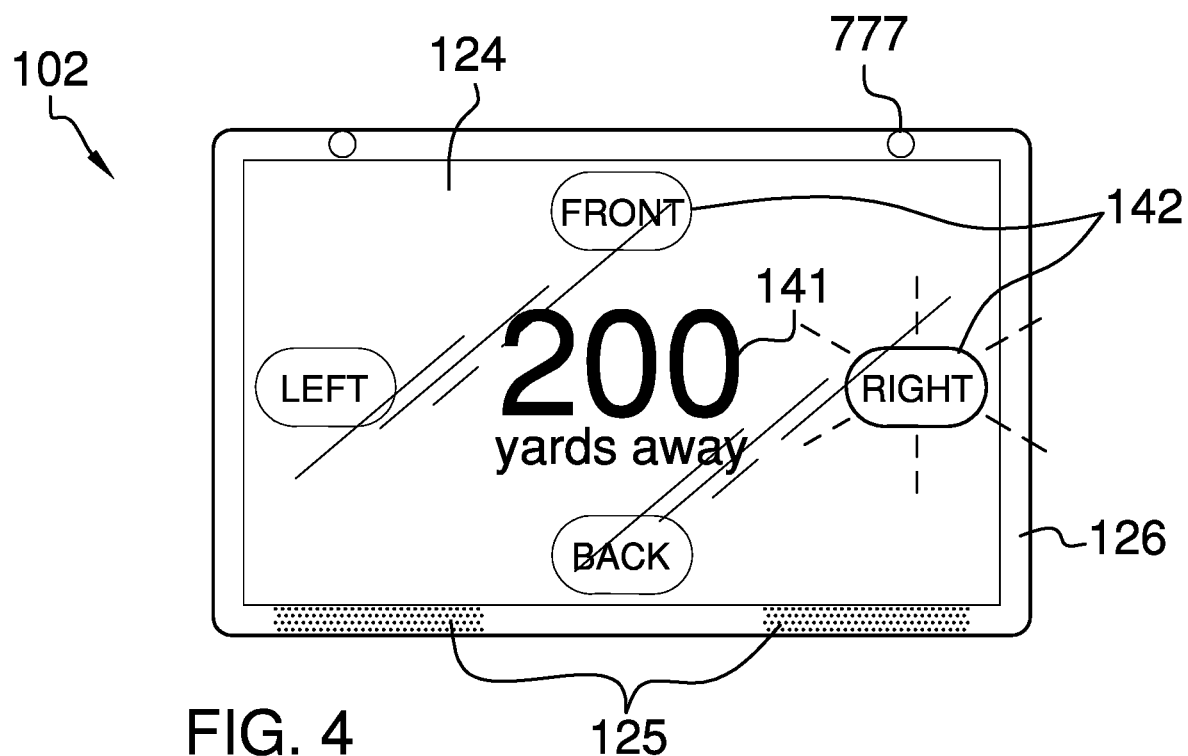
FIG. 4 is a front view of an embodiment of the disclosure.
Figure 5:
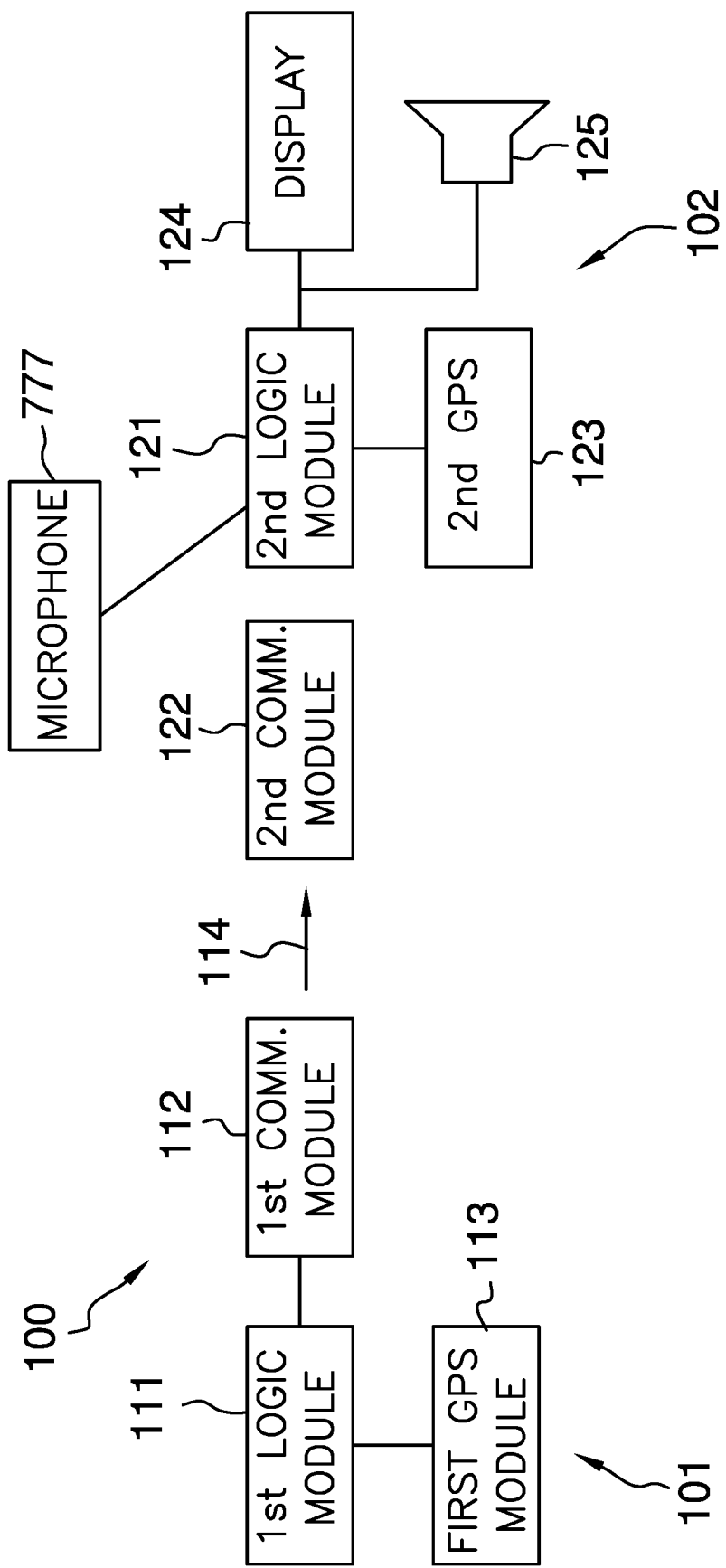
FIG. 5 is a block diagram of an embodiment of the disclosure.

Detailed reference will now be made to one or more potential embodiments of the disclosure, which are illustrated in FIGS. 1 through 5.

The emergency vehicle alert device 100 (hereinafter invention) is a traffic control signal. The invention 100 is configured for use with an emergency vehicle 131. The invention 100 is configured for use with a civilian vehicle 132. The invention 100 comprises an emergency vehicle 131 beacon 101 and a civilian receiver 102. The emergency vehicle 131 beacon 101 mounts in the emergency vehicle 131. The civilian receiver 102 mounts in the civilian vehicle 132. The emergency beacon is activated when the emergency vehicle 131 is operating in an emergency mode selected from the group consisting of: a) traveling with a set of emergency lights activated; b) traveling with an emergency siren activated; and, c) traveling with both the emergency lights and the emergency siren activated.

The emergency vehicle 131 beacon 101 transmits a radio signal when activated. The transmitted radio signal communicates the GPS coordinates of the emergency vehicle 131 (hereinafter the EV GPS coordinates). The civilian receiver 102 receives a plurality of GPS coordinates from the transmitted radio signal. The civilian receiver 102 determines the GPS coordinates of the civilian vehicle 132 (hereinafter CV GPS coordinates). The civilian receiver 102 calculates the direction 142 and distance 141 of the emergency vehicle 131 from the civilian vehicle 132 by comparing the EV GPS coordinates to the CV GPS coordinates. The civilian receiver 102 tracks the distance 141 between the emergency vehicle 131 and the civilian vehicle 132 over time.

If the civilian receiver 102 determines that: a) the emergency vehicle 131 is within a predetermined distance 141 from the civilian vehicle 132; while b) the span of the distance 141 between the emergency vehicle 131 and the civilian vehicle 132 is decreasing; then, c) the civilian receiver 102 generates visual and audible alerts informing the operator of the civilian vehicle 132 of the direction 142 and distance 141 of the emergency vehicle 131 relative to the civilian vehicle 132. The emergency vehicle 131 is defined in greater detail elsewhere in this disclosure. The civilian vehicle 132 refers to a vehicle on a road network that does not have the privileged status of an emergency vehicle 131.

The emergency vehicle 131 beacon 101 is an electrical circuit. The emergency vehicle 131 beacon 101 is maintained in the emergency vehicle 131. The emergency vehicle 131 beacon 101 is a radio frequency device. The emergency vehicle 131 beacon 101 determines the EV GPS coordinates of the emergency vehicle 131. The emergency vehicle 131 beacon 101 continuously broadcasts the EV GPS coordinates of the emergency vehicle 131 as a radio frequency transmission 114 such that all the civilian receivers 102 within range will receive the EV GPS coordinates of the emergency vehicle 131. The emergency vehicle 131 beacon 101 is configured to broadcast the radio frequency transmission 114 when the emergency vehicle 131 is operating in the emergency mode. The emergency vehicle 131 beacon 101 comprises a first logic module 111, a first communication module 112, and a first GPS module 113.

The first logic module 111 is a readily and commercially available programmable electronic device used to manage, regulate, and operate the emergency vehicle 131 beacon 101. Depending on the specific design and the selected components, the first logic module 111 can be a separate component within the emergency vehicle 131 beacon 101 or the functions of the first logic module 111 can be incorporated into another component within the emergency vehicle 131 beacon 101. The first logic module 111 receives the EV GPS coordinates of the first GPS module 113 from the first GPS module 113. The first logic module 111 transmits the EV GPS coordinates to each civilian receiver 102 within range of the first communication module 112 of the first logic module 111.

The first communication module 112 is a wireless transmitter that allows the first logic module 111 to wirelessly broadcast communications to one or more civilian receiver 102. Specifically, the first communication module 112 generates a radio frequency transmission 114 between the emergency vehicle 131 beacon 101 and each civilian receiver 102.

The first GPS module 113 is an electrical device that communicates with the GPS to determine the GPS coordinates of the first GPS module 113. When queried by the first logic module 111, the first GPS module 113 transfers the GPS coordinates to the first logic module 111.

The civilian receiver 102 is an electrical circuit. The civilian receiver 102 is maintained in the civilian vehicle 132. The civilian receiver 102 is a radio frequency device. The civilian receiver 102 receives a plurality of EV GPS coordinates from the continuous broadcast of the emergency vehicle 131 beacon 101. The civilian receiver 102 tracks the CV GPS coordinates of the civilian vehicle 132. The civilian receiver 102 uses the EV GPS coordinates and the CV GPS coordinates to determine the direction 142 and distance 141 of the emergency vehicle 131 relative to the civilian vehicle 132. If the civilian receiver 102 determines that: a) the emergency vehicle 131 is within a previously determined distance 141 of the civilian vehicle 132; and, b) the emergency vehicle 131 is moving in a direction 142 towards the civilian vehicle 132, then, c) the civilian receiver 102 generates a visible and audible alarm indicating the direction 142 and distance 141 of the emergency vehicle 131.

The civilian receiver 102 comprises a second logic module 121, a second communication module 122, a second GPS module 123, a display 124, one or more speakers 125, and a housing 126.

The second logic module 121 is a readily and commercially available programmable electronic device used to manage, regulate, and operate the civilian receiver 102. Depending on the specific design and the selected components, the second logic module 121 can be a separate component within the civilian receiver 102 or the functions of the second logic module 121 can be incorporated into another component within the civilian receiver 102.

The second logic module 121 receives the EV GPS coordinates from the second communication module 122. The second logic module 121 receives the CV GPS coordinates from the second GPS module 123. The second logic module 121 compares the EV GPS coordinates and the CV GPS coordinates to determine the distance 141 of the emergency vehicle 131 from the civilian vehicle 132. The second logic module 121 compares the EV GPS coordinates and the CV GPS coordinates to determine the direction 142 of the emergency vehicle 131 relative to the civilian vehicle 132. If the second logic module 121 determines that the distance 141 of the emergency vehicle 131 from the second GPS module 123 is within a predetermined value and that the emergency vehicle 131 is moving towards the civilian vehicle 132 then the second logic module 121 will activate the display 124 and the one or more speakers 125 to alert the vehicle operator about the civilian vehicle 132.

The second communication module 122 is a wireless receiver that allows the second logic module 121 to receive the radio frequency transmission 114 generated by the emergency vehicle 131 beacon 101. The second communication module 122 demodulates the radio frequency transmission 114 and transfers the transmitted EV GPS coordinates to the second logic module 121.

The second GPS module 123 is an electrical device that communicates with the GPS to determine the GPS coordinates of the second GPS module 123. When queried by the second logic module 121, the second GPS module 123 transfers the GPS coordinates to the second logic module 121.

The display 124 is controlled and operated by the second logic module 121. The display 124 is an electrical device. The display 124 provides a visual indication of the distance 141 of the emergency vehicle 131 from the civilian vehicle 132. The display 124 provides a visual indication of the direction 142 of the emergency vehicle 131 relative to the civilian vehicle 132. Each of the one or more speakers 125 is a transducer that converts electrical signals into audible sounds. Each of the one or more speakers 125 is controlled and operated by the second logic module 121. Each of the one or more speakers 125 generates an audible alarm indicating that information regarding the emergency vehicle 131 is presented on the display 124.

It shall be noted that another embodiment of the invention 100 may include the use of at least one microphone 777. The at least one microphone 777 is wired to the second logic module 121 in order to pick up sounds from the emergency vehicle 131. The second logic module 121 will in turn require the use of software that is able to determine the presence of the emergency vehicle 131, and the associated siren sounds the emergency vehicle 131 makes.

The housing 126 is a rigid casing. The housing 126 contains the balance of the civilian receiver 102. The housing 126 is formed with all apertures and form factors necessary to allow the housing 126 to accommodate the use, the operation, and the external connections of the balance of the civilian receiver 102. Methods to form a housing 126 suitable for the purposes described in this disclosure are well-known and documented in the mechanical arts. The housing 126 further comprises a fastener 127. The fastener 127 is a mechanical structure that attaches the housing 126 to the civilian vehicle 132.

The following definitions were used in this disclosure:

Appropriate Authority: As used in this disclosure, an appropriate authority is a previously determined person or organization that is designated to monitor compliance with, and if necessary enforce, regulatory and legal mandates.

Battery: As used in this disclosure, a battery is a chemical device consisting of one or more cells, in which chemical energy is converted into electricity and used as a source of power. Batteries are commonly defined with a positive terminal and a negative terminal.

Beacon: As used in this disclosure, a beacon refers to a detectable signal that draws the attention of a person or a device to a location. A beacon is commonly used as a guide to the location or as a warning signal about the location.

Display: As used in this disclosure, a display is a surface upon which is presented an image, potentially including, but not limited to, graphic images and text, that is interpretable by an individual viewing the projected image in a meaningful manner.

Emergency Vehicle: As used in this disclosure, an emergency vehicle is a vehicle that is operated on a road network by an appropriate authority. The emergency vehicle is equipped with visible and audible alarms and marking that indicate that the emergency vehicle operates as a privileged vehicle under traffic regulations and that other vehicles operating on the road network are required yield their rights under the traffic regulations to the emergency vehicle.

External Power Source: As used in this disclosure, an external power source is a source of the energy that is externally provided to enable the operation of the present disclosure. Examples of external power sources include, but are not limited to, electrical power sources and compressed air sources.

Fastener: As used in this disclosure, a fastener is a device that is used to join or affix a first object to a second object.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Form Factor: As used in this disclosure, the term form factor refers to the size and shape of an object.

Housing: As used in this disclosure, a housing is a rigid casing that encloses and protects one or more devices.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Speaker: As used in this disclosure, a speaker is an electrical transducer that converts an electrical signal into an audible sound.

Transducer: As used in this disclosure, a transducer is a device that converts a physical quantity, such as pressure or brightness into an electrical signal or a device that converts an electrical signal into a physical quantity.

Transmitter: As used in this disclosure, a transmitter is a device that is used to generate and transmit electromagnetic radiation such as radio signals.

Vehicle: As used in this disclosure, a vehicle is a motorized device used for transporting passengers, goods, or equipment. The term motorized vehicle refers to a vehicle can move under power provided by an electric motor or an internal combustion engine.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An in-vehicle traffic signaling device comprising
an emergency vehicle beacon and a civilian receiver;
wherein the emergency vehicle beacon communicates with the civilian receiver;
wherein the in-vehicle traffic signaling device is configured for use with an emergency vehicle;
wherein the in-vehicle traffic signaling device is configured for use with a civilian vehicle;

wherein the emergency vehicle beacon mounts in the emergency vehicle;
wherein the civilian receiver mounts in the civilian vehicle;
wherein the emergency vehicle beacon transmits a radio signal when activated;
wherein the civilian receiver alerts the occupant of the civilian vehicle of the location of the emergency vehicle;
wherein the emergency beacon is activated when the emergency vehicle is operating in an emergency mode selected from the group consisting of: a) traveling with a set of emergency lights activated; b) traveling with an emergency siren activated; and, c) traveling with both the emergency lights and the emergency siren activated;
wherein the transmitted radio signal communicates the GPS coordinates of the emergency vehicle (hereinafter the EV GPS coordinates);
wherein the civilian receiver receives a plurality of GPS coordinates from the transmitted radio signal;
wherein the civilian receiver determines the GPS coordinates of the civilian vehicle (hereinafter CV GPS coordinates);
wherein the civilian receiver calculates the distance of the emergency vehicle from the civilian vehicle by comparing the EV GPS coordinates to the CV GPS coordinates;
wherein the civilian receiver calculates the direction of the emergency vehicle relative to the civilian vehicle by comparing the EV GPS coordinates to the CV GPS coordinates;
wherein the civilian receiver tracks the distance between the emergency vehicle and the civilian vehicle over time;
wherein the civilian receiver tracks the distance between the emergency vehicle and the civilian vehicle over time;
wherein the civilian receiver generates visual and audible alerts informing the operator of the civilian vehicle of the direction and distance of the emergency vehicle relative to the civilian vehicle when the following conditions are true: a) the emergency vehicle is within a predetermined distance from the civilian vehicle; and, b) the span of the distance between the emergency vehicle and the civilian vehicle is decreasing;
wherein the housing is a rigid casing;
wherein the housing contains the balance of the civilian receiver;
wherein the housing further comprises a fastener;
wherein the fastener is a mechanical structure that attaches the housing to the civilian vehicle;
wherein at least one microphone is wired to the second logic module in order to pick up sounds from the emergency vehicle;
wherein the sounds picked up from the at least one microphone are sent to the second logic module, which in turn is able to determine the presence of the emergency vehicle, and the associated siren sounds the emergency vehicle makes.

2. The in-vehicle traffic signaling device according to claim 1
wherein the emergency vehicle beacon is an electrical circuit;
wherein the emergency vehicle beacon is a radio frequency device;
wherein the emergency vehicle beacon continuously broadcasts the EV GPS coordinates of the emergency vehicle as the radio frequency transmission such that all the civilian receivers within range will receive the EV GPS coordinates of the emergency vehicle.

3. The in-vehicle traffic signaling device according to claim 2
wherein the civilian receiver is an electrical circuit;
wherein the civilian receiver is a radio frequency device;
wherein the civilian receiver receives a plurality of EV GPS coordinates from the continuous broadcast of the emergency vehicle beacon;
wherein the civilian receiver tracks the CV GPS coordinates of the civilian vehicle.

4. The in-vehicle traffic signaling device according to claim 3 wherein the civilian receiver uses the EV GPS coordinates and the CV GPS coordinates to determine the direction and distance of the emergency vehicle relative to the civilian vehicle.

5. The in-vehicle traffic signaling device according to claim 4
wherein the emergency vehicle beacon comprises a first logic module, a first communication module, and a first GPS module;
wherein the first logic module, the first communication module, and the first GPS module are electrically interconnected.

6. The in-vehicle traffic signaling device according to claim 5
wherein the first logic module is a programmable electronic device;
wherein the first logic module receives the EV GPS coordinates of the first GPS module from the first GPS module;
wherein the first logic module transmits the EV GPS coordinates through the first communication module to each civilian receiver within range of the first communication module of the first logic module.

7. The in-vehicle traffic signaling device according to claim 6
wherein the first communication module is a wireless transmitter;
wherein the first communication module generates a radio frequency transmission between the emergency vehicle beacon and each civilian receiver.

8. The in-vehicle traffic signaling device according to claim 7
wherein the first GPS module is an electrical device that communicates with the GPS;
wherein the first GPS module determines the GPS coordinates of the first GPS module;
wherein the first GPS module transfers the GPS coordinates of the first GPS module to the first logic module.

9. The in-vehicle traffic signaling device according to claim 8
wherein the civilian receiver comprises a second logic module, a second communication module, a second GPS module, a display, one or more speakers, and a housing;
wherein the housing contains the second logic module, the second communication module, the second GPS module, the display, and the one or more speakers;
wherein the second logic module, the second communication module, the second GPS module, the display, and the one or more speakers are electrically interconnected.

10. The in-vehicle traffic signaling device according to claim 9
   wherein the second logic module is a programmable electronic device;
   wherein the second logic module receives the EV GPS coordinates from the second communication module;
   wherein the second logic module receives the CV GPS coordinates from the second GPS module;
   wherein the second logic module compares the EV GPS coordinates and the CV GPS coordinates to determine the distance of the emergency vehicle from the civilian vehicle;
   wherein the second logic module compares the EV GPS coordinates and the CV GPS coordinates to determine the direction of the emergency vehicle relative to the civilian vehicle;
   wherein the second logic module activates the display and the one or more speakers to alert the vehicle operator about the civilian vehicle.

11. The in-vehicle traffic signaling device according to claim 10
   wherein the second communication module is a wireless receiver;
   wherein the second communication module receives the radio frequency transmission generated by the emergency vehicle beacon;
   wherein the second communication module demodulates the radio frequency transmission and transfers the transmitted EV GPS coordinates to the second logic module.

12. The in-vehicle traffic signaling device according to claim 11
   wherein a second GPS communicates with the GPS module to determine the GPS coordinates of the second GPS module;
   wherein the second GPS module transfers the GPS coordinates of the second GPS module to the second logic module.

13. The in-vehicle traffic signaling device according to claim 12
   wherein the display is an electrical device;
   wherein the display is controlled and operated by the second logic module.

14. The in-vehicle traffic signaling device according to claim 13
   wherein each of the one or more speakers is a transducer that converts electrical signals into audible sounds;
   wherein each of the one or more speakers is controlled and operated by the second logic module.

15. The in-vehicle traffic signaling device according to claim 14
   wherein the display provides a visual indication of the distance of the emergency vehicle from the civilian vehicle;
   wherein the display provides a visual indication of the direction of the emergency vehicle relative to the civilian vehicle;
   wherein each of the one or more speakers generates an audible alarm indicating that information regarding the emergency vehicle is presented on the display.

* * * * *